June 11, 1968   N. B. ERIKSSON ET AL   3,388,222

CABLE CONNECTOR FOR FIXED AND MOVABLE MEMBERS

Filed Nov. 23, 1966   2 Sheets-Sheet 1

INVENTORS
NILS BÖRJE ERIKSSON
BENGT-OLOF NORDIN
BY
ATTORNEYS

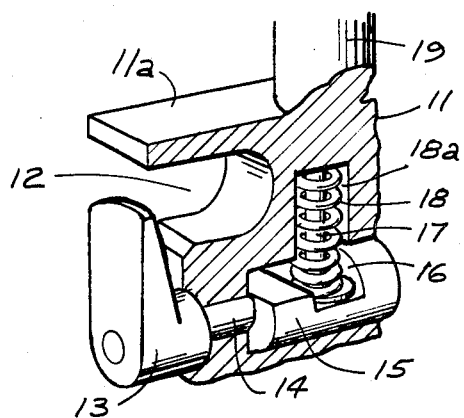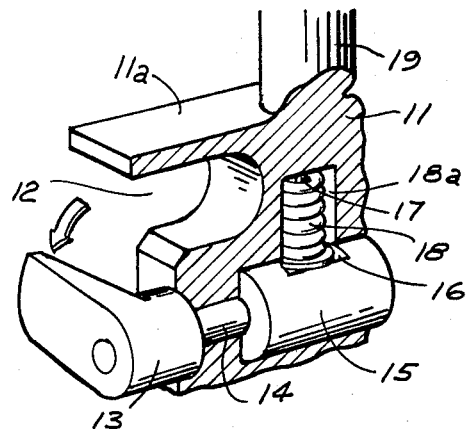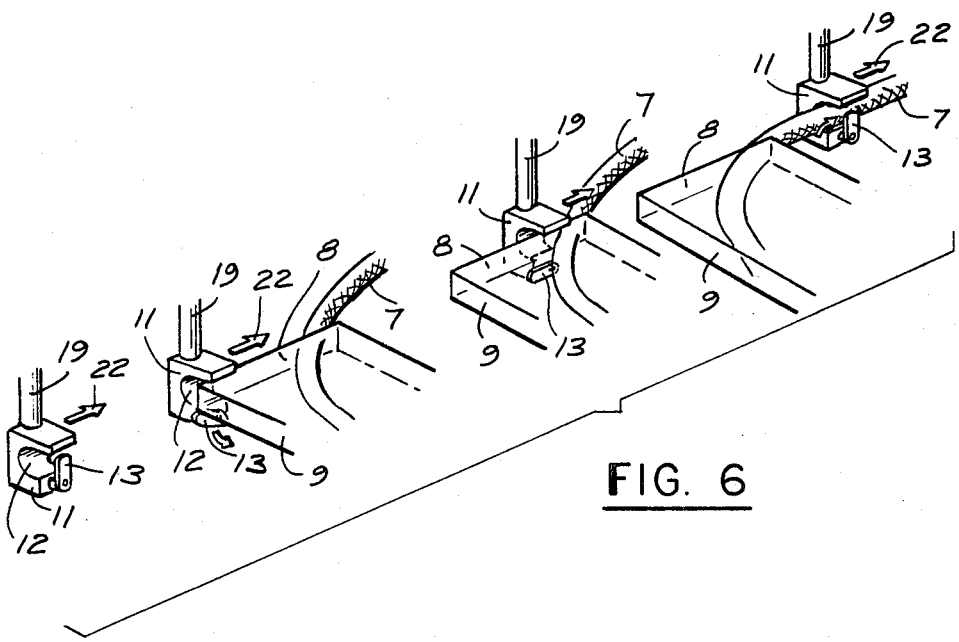

United States Patent Office 3,388,222
Patented June 11, 1968

3,388,222
CABLE CONNECTOR FOR FIXED AND
MOVABLE MEMBERS
Nils Börge Eriksson and Bengt-Olof Nordin, Karlskoga,
Sweden, assignors to Aktiebolaget Bofors, Bofors,
Sweden, a corporation of Sweden
Filed Nov. 23, 1966, Ser. No. 596,482
Claims priority, application Sweden, Dec. 6, 1965,
15,724/65
6 Claims. (Cl. 191—12)

The present invention relates to an electric cable connector connecting cable terminals on a stationary member to cable terminals on a rotary member.

The stationary member may be a support base and the rotatable member may be a member of circular cross section rotatably supported on said base. More specifically, the stationary base may be the body of an armored tank or a gun turret or other weapon carrier, and the rotary member may be a manhole cover rotatable in reference to said body. Connectors of the kind here involved are also widely used for many industrial purposes, for instance on cranes, winches etc.

There are known cable connectors of the general kind above referred to in which the cable connections between the stationary member and the rotary member are effected by slip rings on the stationary member and sliding contacts, made for instance of graphite, on the movable member. Cable connectors of this type require rather frequent servicing, particularly when used on equipment subjected to rough handling such as weapon carriers, cranes etc. Servicing is obviously a difficult problem for equipment used in the field.

It is a broad object of the invention to provide a novel and improved cable connector in which contacts moving together with the rotary member are eliminated thereby removing the primary cause of servicing problems.

The aforepointed out object, feature and advantage and other objects, features and advantages which will be pointed out hereinafter, are obtained by providing a rotary member which has a circular rim portion and is mounted on a stationary member rotatable about an axis coinciding with the center axis of the circular rim portion. A connector member is fixedly secured to the circular rim portion and carries cable terminals on the rotary member and also terminals of a cable supported by the stationary member for connection to a source of power or to control means for controlling circuit components mounted on the rotary member. The main portion of the cable is housed in a magazine mounted on the stationary member. The magazine has an opening so positioned that cable portions are pulled out of the magazine when the rotary member is turned in one direction in reference to the stationary member and are returned into the magazine when the rotary member is turned in the opposite direction. Return of the pulled-out cable portions into the magazine may be effected by gravity or a directional force supplied, for instance by a spring. Releasable cable catching means are secured, spaced apart along the periphery of the circular rim to engage cable portions as the same are withdrawn from the magazine and to retain the engaged cable portions along the rim. Reversal of the rotation of the rotary member for the purpose of returning the withdrawn cable portions into the magazine causes an automatic release of the engaged and retained cable portions.

In the accompanying drawings a preferred embodiment of the invention is shown by way of illustration and not by way of limitation.

In the drawings:

FIG. 4 is an enlarged view, partly in section, of one of the cable catching means of the connector;

FIG. 5 is a view similar to FIG. 4, but showing the catching means in a different operational position; and FIG. 6 shows several phases of the coaction of a catching means with the cable.

Figure 1:
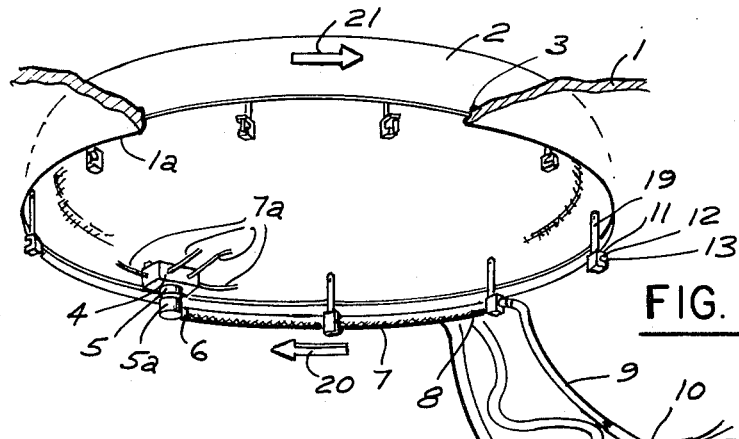
FIG. 1 is a perspective view, partly in section, of a cable connector according to the invention.

Referring now to the figures more in detail, the exemplification of the invention shows a stationary member 1 such as the top wall of an armored tank including a circular manhole 1a. The manhole can be covered by a suitably mounted dome-shaped cover 2 which is rotatable in reference to the manhole. The cover is held in position by a peripherally arranged guide 3 on the top wall of the tank. Covers as here shown are frequently used to accommodate certain control or observation equipment the functions of which require electrical connections with other circuit components or a source of power located in the body of the tank etc. Wire conductors 7a for the equipment located in the cover should be visualized as leading to a connector member 4. A cylindrical part 5 extends from connector member 4 and rotatably supports a second part 5a. The rotational axis of part 5a preferably coincides with the axis of part 5 and may be parallel to the rotational axis of cover 2. A connector sleeve 6 extends from part 5a preferably substantially radially to the rotational axis thereof. Sleeve 6 constitutes an inlet for a cable 7, wire ends of which extend through parts 5 and 5a in axial direction and are connected to the cable ends or terminals within connector member 4 from which they extend to the points of utilization in cover 2 as previously described. As is evident, mounting and connecting cable 7 as described avoids sharp bends in the cable. The cable should be visualized as being of conventional design. It may, of course, be shielded by suitable covers if desired. The main body of the cable is placed in a magazine 9 into which it is led through an opening 8. The free end of the cable may be secured in the magazine as is indicated at 10. The cable should be visualized as being connected to suitable electric equipment stored in the tank body proper.

Magazine 9 is preferably elongate and is shown as having a generally rectangular cross sectional outline. As is clearly shown in FIG. 1, the magazine is disposed substantially radially in reference to manhole 1a and the magazine opening 8 is at one of the short ends thereof so that opening 8 is substantially tangential in reference to the circular outlines of the manhole and cover 2. Obviously, the magazine opening can also be located at a suitable other part of the magazine.

The rim of cover 2 mounts one or preferably several catches 11 which are secured to the cover wall, preferably at the inside thereof, by suitable fastening means indicated at 19. As can best be seen in FIGS. 4 and 5, each catch 11 comprises a member 11a formed with a groove 12 of substantially U-shaped cross section. Each of the grooves 12 is correlated with magazine opening 8 so that the open side of the groove faces opening 8 when a catch 11 is disposed adjacent to the magazine opening for a purpose which will be more fully explained hereinafter. A locking member 13 is disposed in front of the groove of each catch. Each locking member is secured on one end to a pin 14 secured to a cylindrical body 15. Pin 14 and body 15 are rotatably supported in a bore of member 11a. Cylindrical body 15 is formed with a circumferential or transverse groove 16 which is engaged by a pin 17 disposed in a bore 18 in member 11a. A spring 18 encompasses pin 17 and urges the cylindrical body 15 into an angular position in which locking member 13 is substantially blocking groove 12 as is shown in FIG. 4.

The cable connector as hereinbefore described operates as follows:

Let it be assumed that cover 2 is in the position shown in FIG. 1. As is apparent from this figure, cable 7 is partly withdrawn from magazine 9. When now cover 2 is rotated in the direction indicated by arrows 20 and 21, the cable is further pulled out of magazine 9 thereby bringing the catch 11 shown to the right of the magazine in FIG. 1 into engagement with the right hand or leading edge of the magazine. More specifically, locking member 13 will engage this edge and as a result the locking member is turned from the position of FIG. 4 into the position of FIG. 5 against the action of spring 18 thereby uncovering groove 12. As the catch moves further along opening 8 of the magazine, the respective cable portion will fit itself into groove 12. When now locking member 13 passes the left hand or trailing edge of the magazine, locking member 13 will snap back into the position of FIG. 4, thereby retaining the engaged cable portion in the groove. FIG. 6 shows very clearly the sequence of operations. Arrow 22 signifies the same direction of movement as arrows 20 and 21.

As is evident, cover 2 can be turned through a complete revolution in which case the cable frames the entire rim of cover 2 and is held in such position by successive catches 11.

When now cover 2 is rotated in the opposite direction each catch is released as its locking member 13 engages the left hand edge of the magaizne and is thus forced into the position of FIG. 5 thereby releasing the respective retained cable portion which will return into the magazine, either by its own weight or due to spring action or a similar directional force. When the respective catch clears the right hand edge of the magazine the locking member thereof will reclose itself.

Figure 2:
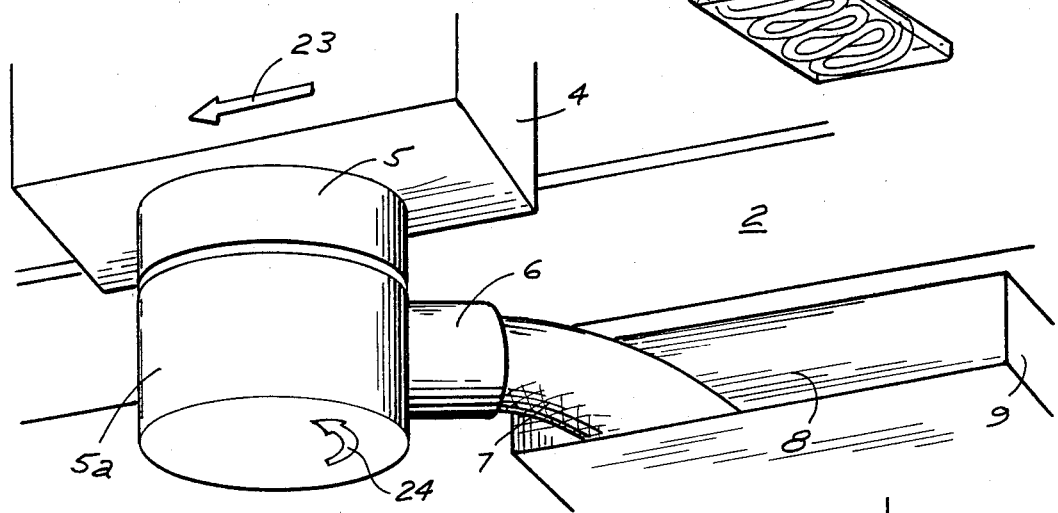
FIG. 2 is an enlarged perspective view of the connector member of the cable connector.

As is shown in FIG. 2, the radial position of guide sleeve 6 on part 5a and the rotation of part 5a in reference to part 5 and connector member 4 cause the cable to fit itself smoothly along the rim of cover 2 and to return in the magazine without ever being subjected to sharp bends which tend to be destructive to a cable.

Figure 3:
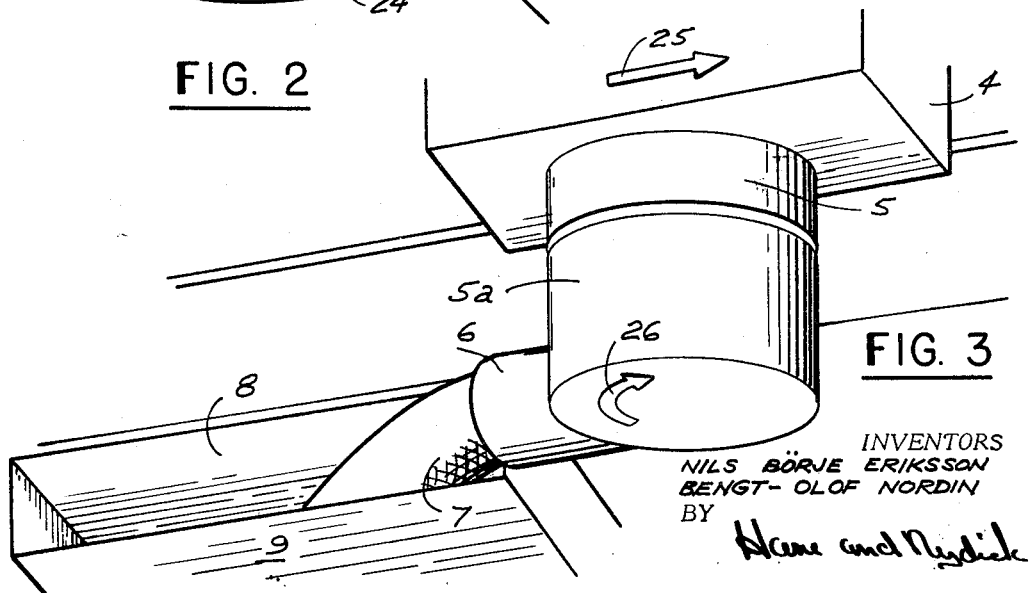
FIG. 3 is a perspective view similar to FIG. 2 but showing the connector member in a different operational position in reference to the magazine.

FIG. 2 also indicates by an arrow 24 the turning movement of part 5a when cover 2 is rotated in the direction of arrow 23. FIG. 3 illustrates the opposite turning movement, that is, cover 2 is moving in the direction of arrow 25 and part 5a is rotated in the direction of arrow 26.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A cable connector connectng cable terminals on a stationary member to cable terminals on a rotary member, said connector comprising in combination;

(a) a stationary member (1);
(b) a rotatable member (2) supporting cable terminals and having a circular portion and being rotatable about an axis coinciding with the center axis of said circular member portion;
(c) an electric cable (7) having cable terminals at one end;
(d) a connector member (4) connecting cable terminals on the rotatable member to said cable terminals at one end of the cable, said connector member being fixedly secured to said circular member portion;
(e) a magazine (9) mounted on said stationary member and housing said cable (7), said cable magazine having an opening (8) adjacent to said circular member portion; and
(f) several releasable cable catching means (11) secured spaced apart along the periphery of said circular member portion for rotation in unison with said rotatable member, said catching means coacting with said cable to engage and retain along said circular member portion cable portions pulled out of the magazine by rotation of the rotatable member in one direction and to release the retained cable portions when and while the same are returned into the magazine by rotating the rotatable member in the opposite direction.

2. A cable connector according to claim 1 wherein said stationary member (1) has a circular opening (1a), and said rotatable member (2) comprises a closure member for said opening, the rim of said opening constituting said circular member portion.

3. A cable connector according to claim 1 wherein said magazine (9) is elongate in substantially radial direction in reference to the rotational axis of said rotatable member, said magazine opening (8) being disposed substantially tangentially of said circular member portion, closely adjacent thereto.

4. A cable connector according to claim 1 wherein said connector member (4) comprises two parts (5, 5a) movable in reference to each other, said cable terminals being connected within said parts.

5. A cable connector according to claim 4, wherein one of said parts (5) is fixedly secured to said circular member portion and the other part (5a) is rotatable in reference to said one part about an axis parallel to the rotational axis of said rotatable member (2).

6. A cable connector according to claim 5 wherein said cable is secured to said other member part (5a) substantially normal to the rotational axis thereof.

No references cited.

ARTHUR L. LA POINT, *Primary Examiner.*

S. T. KRAWCZEWICZ, *Assistant Examiner.*